United States Patent [19]
Siegel

[11] Patent Number: 6,123,396
[45] Date of Patent: Sep. 26, 2000

[54] SLIP-CONTROLLED HYDRAULIC VEHICLE BRAKE SYSTEM

[75] Inventor: Heinz Siegel, Stuttgart, Germany

[73] Assignee: Robert Bosch GmbH, Stuttgart, Germany

[21] Appl. No.: 09/284,063

[22] PCT Filed: Sep. 18, 1997

[86] PCT No.: PCT/DE97/02084

§ 371 Date: Apr. 7, 1999

§ 102(e) Date: Apr. 7, 1999

[87] PCT Pub. No.: WO98/17516

PCT Pub. Date: Apr. 30, 1998

[30] Foreign Application Priority Data

Oct. 21, 1996 [DE] Germany ............... 196 43 343

[51] Int. Cl.$^7$ ........................................ B60T 8/40
[52] U.S. Cl. .................. 303/116.1; 303/900; 303/901
[58] Field of Search ........................ 303/113.2, 900, 303/901, 116.1

[56] References Cited

U.S. PATENT DOCUMENTS 4,927,213  5/1990  Burgdore ................. 303/116.1
5,048,899  9/1991  Schmitt et al. ............. 303/113.2
5,529,388  6/1996  Yasui ........................ 303/116.1

FOREIGN PATENT DOCUMENTS 0 253 157   1/1988   European Pat. Off. .
96/04159  12/1996   European Pat. Off. .
39 09 167   9/1990   Germany .
43 42 918   6/1995   Germany .

*Primary Examiner*—Robert J. Oberleitner
*Assistant Examiner*—Devon Kramer
*Attorney, Agent, or Firm*—Ronald E. Greigg; Edwin E. Greigg

[57] ABSTRACT

A slip-controlled hydraulic vehicle brake system having brake lines that extend between a dual-circuit master cylinder and a respective wheel brake cylinder. A shutoff valve in the respective brake line. A bypass line that bypasses the respective shutoff valve. A pump in the respective bypass line for pumping pressure fluid, drawn from the associated wheel brake cylinder to the master cylinder. The pump (30) is also embodied to feed pressure fluid from the master cylinder to the wheel brake cylinder. The pump is a recirculating positive-displacement vane cell pump. The pump in the bypass lines has a common drive motor whose rotational direction can be reversed. The vehicle brake system is embodied for anti-lock and traction control operation at no additional expense for equipment.

7 Claims, 2 Drawing Sheets

SLIP-CONTROLLED HYDRAULIC VEHICLE BRAKE SYSTEM

PRIOR ART

The invention relates to a slip-controlled brake system for a vehicle.

One such brake system is already known for the front axle of a vehicle (German Patent Disclosure DE 43 42 918 A1). The wheels of the rear axle are braked electromechanically. With this brake system, anti-lock operation is possible. The hydraulic portion of the brake system for the slip control is designed very simply; it makes do with one magnet valve and one pump per wheel brake. The brake system, which can be manufactured economically, is especially suitable for small vehicles with front wheel drive.

From European Patent Disclosure EP 0 253 157 A1, a slip-controlled vehicle brake system is known that aside from the shutoff valve is equivalent to the generic type in question here and also has a pump with a reversible direction of rotation. Instead of the shutoff valve, this brake system has a hydraulically or electrically switchable flow limiter. With 20 a brake system equipped in this way.

A vehicle brake system is also known (German Patent Disclosure DE 39 09 167 A1) in which a pump with reversible direction of rotation is disposed in the brake circuit of the driven vehicle wheels and can be connected to brake lines via 3/3-way valves in order to make anti-lock and traction control modes possible.

ADVANTAGES OF THE INVENTION

The vehicle brake system according to the invention as defined by the characteristics of the body of claim 1 has the advantage over the prior art that with the intended pump type, both anti-lock and traction control modes are possible with otherwise simple valve outfitting; that is, only one shutoff valve per wheel brake cylinder is necessary.

By means of the provisions recited in the dependent claims, advantageous refinements of and improvements to the vehicle brake system defined by claim 1 are possible.

With the design of the vehicle brake system defined by claim 2, on the one hand in the anti-lock mode a reduction in pulsation of the feed flow of the pump and on the other in the traction control mode an unthrottled aspiration of pressure fluid by the pump are obtained. In the anti-lock mode, noise abatement is attained, while in the traction control mode an improvement to control dynamics is attained.

These advantages are also attained, but at reduced expense, in the refinement of the vehicle brake system defined.

With the improvement disclosed herein, a reduction in the pulsation of the feed flow of the pump is also attained in the traction control mode, while in the anti-lock mode an unthrottled pressure reduction from the wheel brake cylinder is attained.

The provisions set forth avoid the development of negative pressure in the wheel brake cylinder while the pump is pumping in the anti-lock mode.

With the refinement of the vehicle brake system set forth, in the anti-lock mode upon pressure reduction in the wheel brake cylinder by closure of the only slightly spring-loaded or non-spring-loaded check valve, it is attained that the pressure retention valve acting to avert negative pressure in the wheel brake cylinder becomes operative. Conversely, in the traction control mode, only a slight pressure drop becomes operative at the check valve, which is advantageous.

The embodiment of the vehicle brake system defined by claim 7 makes it possible in a simple way to influence the speed of pressure buildup or reduction in the wheel brake cylinder.

BRIEF DESCRIPTION OF THE DRAWINGS

Two exemplary embodiments of the invention are shown in simplified form in the drawing and described in further detail in the ensuing description.

DESCRIPTION OF THE EXEMPLARY EMBODIMENTS

Figure 1:
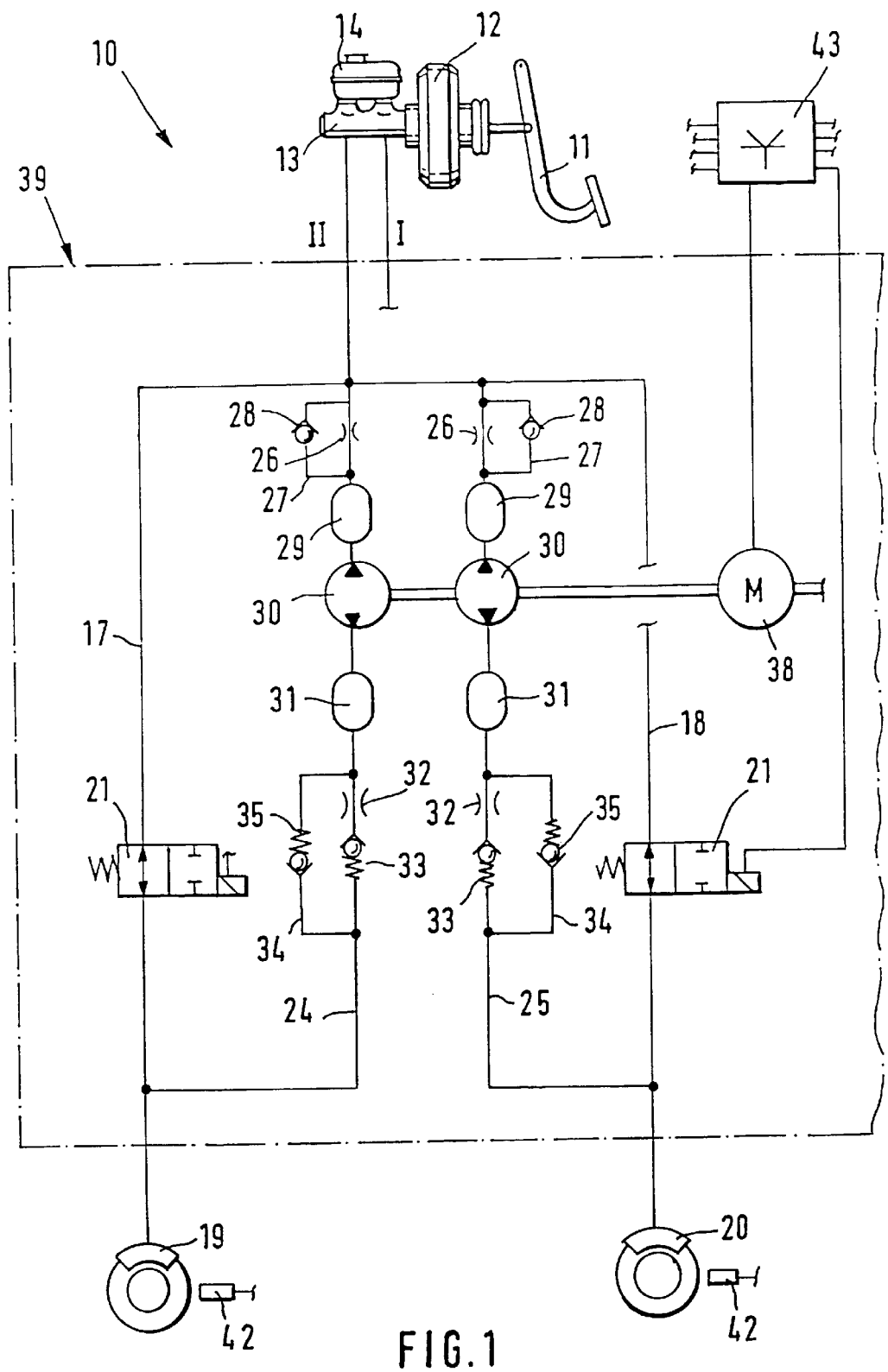
FIG. 1 shows a circuit diagram for a vehicle brake system including pumps with two flow directions.

The first exemplary embodiment, shown in FIG. 1, of a slip-controlled vehicle brake system 10 has a dual-circuit master cylinder 13 that is actuatable with a brake pedal 11 via a brake booster 12 and that has a pressure fluid reservoir 14. Connected to the master cylinder 13 are two brake circuits I and II, of which only brake circuit II is schematically shown in FIG. 1. Brake circuit I is embodied identically to brake circuit II.

Connected to brake circuit II are brake lines 17 and 18, of which the brake line 17 leads to a wheel brake cylinder 19 that is assigned for instance to a wheel brake on the front axle of the vehicle. The brake line 18 communicates with a wheel brake cylinder 20 on a wheel brake of the rear axle of the vehicle. Only one shutoff valve 21 is disposed in the respective brake line 17, 18, and this valve has two switching positions, namely a spring-actuated open position and an electromagnet-actuated blocking position. In a departure from the illustration used in FIG. 1 of the 2/2-way valve with two discrete switching positions, the shutoff valve may also be embodied as a throttling multiway valve with an infinite number of intermediate switching positions and variable throttling action.

The two shutoff valves 21 are each bypassed by a respective bypass line 24 and 25. The following elements of the brake system 10 are located in each of the bypass lines 24, 25, beginning at the master cylinder: a throttle 26, which is bypassed by a line 27 with a check valve 28 whose open direction is from the master cylinder 13 to the wheel brake cylinder 19; a damper chamber 29; a pump 30 that pumps in two flow directions; a damper chamber 31, a throttle 32, a check valve 33 with little or no spring loading, the throttle 32 and the check valve 33 being bypassed by a line 34, in which a pressure retention valve 35 is located, in an anti-parallel circuit to the check valve 33. The pressure retention valve 35, represented as a throttle valve, has an open direction from the wheel brake cylinder 19 to the master cylinder 13, and the check valve 33 has an open direction opposite that of valve 35.

The pumps 30 in the two bypass lines 24, 25 of the brake circuit II, like the two pumps, not shown, in brake circuit I, can be driven by a common electric motor 38 whose direction of rotation is reversible. The pumps 30 are embodied as recirculating positive-displacement pumps, for instance as vane cell pumps.

The aforementioned elements, disposed between the master cylinder and 13 and the wheel brake cylinders 19, 20 of brake circuit II, are combined, as are those of brake circuit I, in a structural unit suggested by dot-dashed lines in FIG. 1 and designated as a hydraulic unit 39.

Also belonging to the vehicle brake system 10 are wheel rotation sensors 42, belonging to the wheel brakes, and an electronic control unit 43, which on the basis of the signals of the wheel rotation sensors 42 switches the shutoff valves 21 and the electric drive motor 38 for the anti-lock mode or traction control mode, in accordance with specified control algorithms.

The vehicle brake system 10 has the following mode of operation:

By actuation of the brake pedal 11, pressure can be generated in the master cylinder 13 that is transmitted into the wheel brake cylinders 19, 20 of all the vehicle wheels through the brake lines 17, 18 of brake circuit II and the brake lines of brake circuit I. If upon braking the threat of locking arises, for instance at the vehicle wheel associated with the wheel brake cylinder 20, then the control unit 43 now switches on the electric drive motor 38, so that pressure fluid can be pumped out of the wheel brake cylinder 20 to the master cylinder 13 by the pump 30 located in the bypass line 25. In the process, the control unit 43 switches the shutoff valve 21 in the brake line 18 into throttling intermediate positions, for instance by pulse width modulation, in order to vary the pressure reduction speed in the wheel brake cylinder 20, or into the blocking position. The pressure fluid drawn from the wheel brake cylinder 20 flows through the pressure retention valve 35, the damper chamber 31, the pump 30, the damper chamber 29, and the throttle 26 of the bypass line 25. In conjunction with the throttle 26, the damper chamber 29 reduces pulsation, caused by the pump 30, in the feed flow. This kind of pressure reduction is followed by phases for pressure holding and pressure buildup. By suitable control of the shutoff valve 21 into intermediate positions, pressure holding is possible in such a way that the volumetric flow drawn from the wheel brake cylinder 20 by the pump 30 is replaced with pressure fluid that flows through the brake line 18 to the wheel brake cylinder 20. Pressure buildup in the wheel brake cylinder 20 is attained by switching the shutoff valve 21 into its open position; the pressure buildup speed can be varied by switching the shutoff valve 21 into intermediate positions or by reducing the pump feed flow by suitably controlling the drive motor 38, unless another wheel brake of the vehicle is also requiring anti-lock control. If the anti-lock mode requires a pressure reduction to very low pressures in the wheel brake cylinder 20, then the pressure retention valve 35, set to a closing pressure of 1 bar, for instance, thus prevents the development of negative pressure in the wheel brake cylinder 20.

If upon startup or acceleration of the vehicle, the vehicle wheel assigned to wheel brake cylinder 19, for instance, is subject to impermissibly high drive slip, then the control unit 43 switches the shutoff valve 21 in the brake line 17 to the blocking position and turns on the drive motor 38, so that pressure fluid can be pumped from the master cylinder 13 into the wheel brake cylinder 19 by means of the pump 30 disposed in the bypass line 24. In the process, the pressure fluid takes its course via the check valve 28 in the line 27, the damper chamber 29, the pump 30, the damper chamber 31, the throttle 32, and the check valve 33 in the bypass line 24. While the throttle 26 is inoperative, the throttle 32 irons out the feed flow of the pump 30, making the traction control smoother. Correspondingly, in the anti-lock mode, both pressure holding in the wheel brake cylinder 19 and varying the pressure buildup and pressure reduction speed are possible as described above as well, by triggering the shutoff valve 21 in the brake line 17 and by triggering the drive motor 38. Pressure reduction in the wheel brake cylinder 19 is effected by switching the shutoff valve 21 to the open position.

Figure 2:
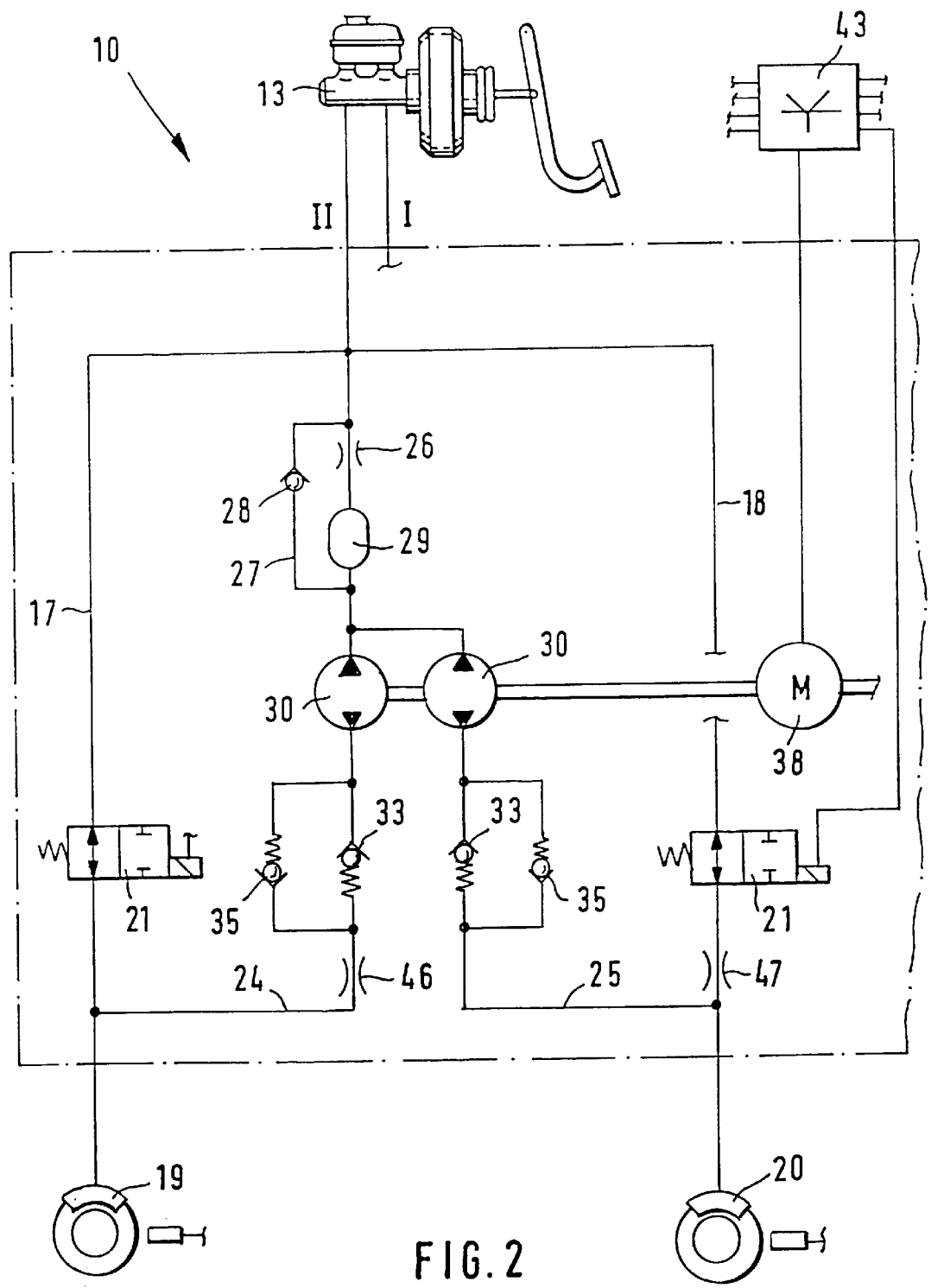
FIG. 2 shows a circuit diagram for a vehicle brake system that is simplified compared with FIG. 1.

The second exemplary embodiment, shown in FIG. 2, of the vehicle brake system 10 is distinguished by the following simplifications of the hydraulic circuit:

For example, the bypass lines 24, 25 are combined between the master cylinder 13 and the pumps 30 and contain a common assembly comprising the throttle 26 and the damper chamber 29. This assembly is operative, as in the preceding exemplary embodiment, in the anti-lock mode for reducing pulsation in the feed flow of the pumps 30. The check valve 28 assigned to the assembly is located in a line 27, which unlike the preceding exemplary embodiment bypasses both the throttle 26 and the damper chamber 29. This speeds up the aspiration of pressure fluid from the master cylinder 13 by the pumps 30 in the traction control mode.

The antiparallel circuit of the check valve 33 and the pressure retention valve 35, known from the first exemplary embodiment, is assigned to the respective bypass lines 24, 25 between the pumps 30 and the wheel brake cylinders 19, 20. Conversely, the damper chamber 31 and the throttle 32 in the respective bypass line 24, 25 between the pumps and the check valves 33 are dispensed with. Furthermore, a throttle 46 is disposed in the bypass line 24 and slows down the pressure reduction in the wheel brake cylinder 19 in the anti-lock mode. Conversely, in the brake line 18 assigned to the wheel brake cylinder 20 there is a second throttle 47, which in the anti-lock mode slows the pressure buildup in the wheel brake cylinder 20. Since no throttle is contained in the bypass line 25 between the pump 30 and the wheel brake cylinder 20, a pressure reduction from the wheel brake cylinder 20 in the anti-lock mode is effected at high pressure reduction speed, which is advantageous in view of the risk of skidding because of locked wheels at the rear axle of the vehicle. With the aid of the throttles 46 and 47, it is accordingly possible to adapt the brake system 10 to a specific vehicle.

The foregoing relates to a preferred exemplary embodiment of the invention, it being understood that other variants and embodiments thereof are possible within the spirit and scope of the invention, the latter being defined by the appended claims.

I claim:

1. A slip-controlled vehicle brake system (10), comprising brake lines (17, 18) that extend between a dual-circuit master cylinder (13) and a respective wheel brake cylinder (19, 20) in each of the brake lines (17, 18), a shutoff valve (21) in each respective brake line (17, 18) of the brake system, a bypass line (24, 25) that bypasses each respective shutoff valve (21) in said brake lines, and a pump (30) in each respective bypass line (24, 25) for pumping pressure fluid, drawn from the associated wheel brake cylinders (19, 20), to the master cylinder (13), each of the pumps (30) are also embodied for pumping pressure fluid from the master cylinder (13) to the wheel brake cylinder (19, 20);

each of the pumps (30) are a recirculating positive-displacement vane cell pump; and each of the pumps (30) in the bypass lines (24, 25) have a common drive motor (38) whose rotational direction is reversible.

2. The vehicle brake system of claim 1, in which in each of the bypass lines (24, 25) between the pump (30) and the master cylinder (13), a damper chamber (29) and a throttle are disposed, at least the throttle (26) is bypassed by a line

(27) having a check valve (28) therein that opens counter to the pump (30).

3. The vehicle brake system of claim 2, in which each of the bypass lines (24, 25) of a brake circuit (II) having at least two brake lines (17, 18) have a common disposition, comprising a damper chamber (29), a throttle (26) and a check valve (28), between the pump (30) and the master cylinder (13).

4. The vehicle brake system of claim 1, in which a damper chamber (31) and a throttle (32) are disposed in each of the bypass lines (24, 25) between the pump (30) and the wheel brake cylinder (19, 20), and at least the throttle (32) is bypassed by a pressure retention valve (35) that opens counter to the pump (30).

5. The vehicle brake system of claim 1, in which a check valve (33) that opens counter to the wheel brake cylinder (19, 20) is disposed in the bypass line (24, 25) between the wheel brake cylinder (19, 20) and the pump (30).

6. The vehicle brake system of claim 5, in which the check valve (33), disposed in the bypass line (24, 25) in an antiparallel circuit with a pressure retention valve (35), is embodied with only a slight spring loading.

7. The vehicle brake system of claim 1, in which a throttle (47, 46) is disposed between the wheel brake cylinder (20) and the shutoff valve (21) in the brake line (18), or between the wheel brake cylinder (19) and the pump (30) in the bypass line (24).

* * * * *